United States Patent
Tao et al.

(10) Patent No.: US 12,107,792 B2
(45) Date of Patent: Oct. 1, 2024

(54) BIT REDUCTION IN RESOURCE INFORMATION

(71) Applicant: Nokia Technologies Oy, Espoo (FI)

(72) Inventors: Tao Tao, Shanghai (CN); Karol Schober, Helsinki (FI); Timo Lunttila, Espoo (FI); Kari Hooli, Oulu (FI); Claudio Rosa, Randers NV (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 430 days.

(21) Appl. No.: 17/631,573

(22) PCT Filed: Aug. 9, 2019

(86) PCT No.: PCT/CN2019/099992
§ 371 (c)(1),
(2) Date: Jan. 31, 2022

(87) PCT Pub. No.: WO2021/026687
PCT Pub. Date: Feb. 18, 2021

(65) Prior Publication Data
US 2022/0271895 A1  Aug. 25, 2022

(51) Int. Cl.
*H04L 5/00* (2006.01)
*H04W 74/00* (2009.01)

(52) U.S. Cl.
CPC ......... *H04L 5/0053* (2013.01); *H04W 74/006* (2013.01)

(58) Field of Classification Search
CPC .. H04L 5/0053; H04W 74/006; H04W 72/23; H04W 28/06
See application file for complete search history.

(56) References Cited

U.S. PATENT DOCUMENTS

| | | | |
|---|---|---|---|
| 2011/0080903 A1 | 4/2011 | Yin et al. | |
| 2012/0307776 A1* | 12/2012 | Hong | H04W 72/23 370/329 |
| 2017/0310429 A1* | 10/2017 | Wang | H04L 1/1861 |
| 2021/0160035 A1* | 5/2021 | Kittichokechai | H04W 72/23 |

FOREIGN PATENT DOCUMENTS

| | | |
|---|---|---|
| CN | 102648596 A | 8/2012 |
| CN | 108966349 A | 12/2018 |
| CN | 109327295 A | 2/2019 |

OTHER PUBLICATIONS

Extended European Search Report received for corresponding European Patent Application No. 19941460.8, dated Mar. 29, 2023, 11 pages.

(Continued)

*Primary Examiner* — Jung H Park

(74) *Attorney, Agent, or Firm* — Robert P. Michal, Esq.; Carter, DeLuca & Farrell LLP

(57) ABSTRACT

Embodiments of the present disclosure relate to bit reduction in resource information. According to embodiments of the present disclosure, the number of bits to indicate the resource allocation is reduced and the network device generate the control information based on an offset associated with the bit reduction. In this way, multiple transmission opportunities for the transmission of Msg3 of the random access procedure are provided without increasing the signaling overhead.

1 Claim, 9 Drawing Sheets

(56) References Cited

OTHER PUBLICATIONS

"Scheduling Policy and Signaling Way on DL Resource Allocation", 3GPP TSG RAN WG1 #48bis, R1-071395, Agenda: 7.11.2, Mitsubishi Electric, Mar. 26-30, 2007, pp. 1-6.
Office Action received for corresponding Indian Patent Application No. 202247006060, dated Apr. 27, 2022, 5 pages.
"New WID on NR-based Access to Unlicensed Spectrum", 3GPP TSG RAN Meeting #82, RP-182878, Agenda: 9.1.1, Qualcomm Inc, Dec. 10-13, 2018, 8 pages.
"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.
"3rd Generation Partnership Project; Technical Specification Group Radio Access Network; NR; Medium Access Control (MAC) protocol specification (Release 15)", 3GPP TS 38.321, V15.5.0, Dec. 2018, pp. 1-78.
"Increasing Tx opportunities for UL RA messages", 3GPP TSG-RAN WG2 Meeting #105bis, R2-1904028, Agenda: 11.2.1.1, Nokia, Apr. 8-12, 2019, 4 pages.
"3rd Generation Partnership Project; Technical Specification Group Radio Access Network; NR; Physical layer procedures for data (Release 15)", 3GPP TS 38.214, V15.6.0, Jun. 2019, pp. 1-105.
"IEEE 802.11", Wikipedia, Retrieved on Jan. 31, 2022, Webpage available at : https://en.wikipedia.org/wiki/IEEE_802.11.
International Search Report and Written Opinion received for corresponding Patent Cooperation Treaty Application No. PCT/CN2019/099992, dated May 7, 2020, 9 pages.

\* cited by examiner

BIT REDUCTION IN RESOURCE INFORMATION

RELATED APPLICATION

This application was originally filed as PCT Application No. PCT/CN2019/099992 on Aug. 9, 2019, each of which is incorporated herein by reference in its entirety.

FIELD

Embodiments of the present disclosure generally relate to the field of communications and in particular, to a method, device, apparatus and computer readable storage medium for bit reduction in resource information.

BACKGROUND

With developments of communication systems, new technologies have been proposed. Communications on unlicensed spectrum have been proposed to improve communication capacity. For example, random access channel (RACH) is shared by terminal devices to request access to networks for call set-up and burst data transmission. The terminal device may transmit a random access request to the network device and the network device may allocate the resources to the terminal devices in the random access response. Alternatively, the network may allocate resources to a connected terminal device for a burst of data transmission by downlink control signalling.

SUMMARY

Generally, embodiments of the present disclosure relate to a method for bit reduction in resource information and the corresponding communication devices.

In a first aspect, there is provided a first device. The first device comprises at least one processor; and at least one memory including computer program codes; the at least one memory and the computer program codes are configured to, with the at least one processor, cause the first device to determine bit reduction is to be performed on resource allocation. The first device is further caused to receive, at a first device and from a second device, control information comprising an indication of resources allocated to the first device. Bit reduction has been performed on the indication. The first device is also caused to determine an offset associated with the bit reduction. The first device is further caused to determine the resources allocated to the first device based on the offset and the indication.

In a second aspect, there is provided a second device. The second device comprises at least one processor; and at least one memory including computer program codes; the at least one memory and the computer program codes are configured to, with the at least one processor, cause the second device to determine resources allocated to a first device based on reduced number of bits of resource allocation. The second device is further caused to obtain an offset associated with bit reduction performed on control information concerning resource allocation. The second device is also caused to generate, based on the offset, the control information comprising an indication concerning resources allocated to a first device. The second device is further caused to transmit the control information to the first device.

In a third aspect, there is provided a method. The method comprises determining bit reduction is to be performed on resource allocation. The method further comprises receiving, at a first device and from a second device, control information comprising an indication of resources allocated to the first device. Bit reduction has been performed on the control information. The method also comprises obtaining an offset associated with the bit reduction. The method further comprises determining the resources allocated to the first device based on the offset and the indication.

In a fourth aspect, there is provided a method. The method comprises determining resources allocated for a first device based on reduced number of bits of resource allocation. The method further comprises determining, at a second device, an offset associated with bit reduction performed on an indication concerning the resources allocated to the first device. The method further comprises generating, based on the offset, control information concerning resource allocation comprising the indication. The method also comprises transmitting the control information to the first device.

In a fifth aspect, there is provided an apparatus. The apparatus comprises means for determining bit reduction is to be performed on resource allocation. The apparatus further comprises means for receiving, at a first device and from a second device, control information comprising an indication of resources allocated to the first device, wherein bit reduction has been performed on the indication. The apparatus also comprises means for determining an offset associated with the bit reduction. The apparatus further comprises means for determining the resources allocated to the first device based on the offset and the indication.

In a sixth aspect, there is provided an apparatus. The apparatus comprises means for determining a resource allocation for a first device based on reduced number of bits of resource allocation. The apparatus also comprises means for determining, at a second device, an offset associated with bit reduction performed on an indication concerning resources allocated to the first device. The apparatus also comprises means for generating, based on the offset, control information concerning resource allocation comprising the indication. The apparatus further comprises means for transmitting the control information to the first device.

In a seventh aspect, there is provided a non-transitory computer readable medium comprising program instructions for causing an apparatus to perform at least the method according to any one of the above third to fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
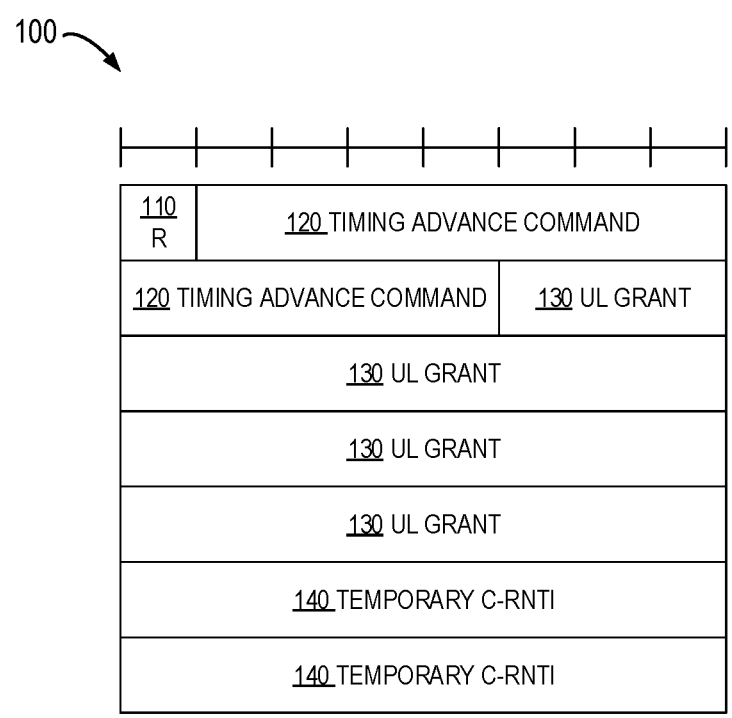
FIG. 1 illustrates a schematic diagram of medium access control (MAC) random access response (RAR)

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a user equipment and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a user equipment accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mention above, the network device may allocate the resources to the terminal device and transmit the information of the resource allocation in the random access response (RAR). FIG. 1 illustrates a schematic diagram of MAC RAR 100. As shown in FIG. 1, the MAC RAR 100 comprises a reserved bit 210 which set to "0." The MAC RAR 100 also comprises the Timing Advance (TA) Command field 220 which indicates the index value TA used to control the amount of timing adjustment. The size of the Timing Advance Command field 220 is 12 bits. The MAC RAR 100 further comprises an uplink (UL) grant field 130 which indicates the resources to be used on the uplink. The size of the UL Grant field 130 is 27 bits. The MAC RAR 100 yet comprises a temporary Cell-RadioNetworkTemporaryIdentifier (C-RNTI) field 140 which indicates the temporary identity that is used by the MAC entity during Random Access. The size of the Temporary C-RNTI field 140 is 16 bits.

In New Radio (NR) and Long-term Evolution (LTE) communications system, the resources can be regarded as a plurality of physical resource blocks (PRBs). The resources allocated to one terminal device may be represented by a start position and the number of the PRBs. For a bandwidth part (BWP) of N resource blocks (RBs), a start RB and number of allocated RBs may be coded jointly, i.e. mapped to unique resource indication value (RIV). Table 1 shows the algorithm of mapping the resource allocations to RIV. This type of resource allocation is used for allocating resources for MSG3, for allocating resources by fall-back DCI formats 0_0 and 0_1, and may be used for allocation resources using non-fall-back DCI formats 0_1 and 1_1.

According to the New Radio-Unlicensed (NR-U) work item description, NR-U shall support different deployment scenarios including carrier aggregation between licensed band NR (PCell) and NR-U (SCell). This is sometimes also referred to as NR Licensed-Assisted Access (LAA) scenario. In NR LAA scenario, SCell and PCell may be in different Time Advance Group (TAG). If the terminal device performs contention-free random access via unlicensed SCell, the RAR will be provided from licensed PCell. When transmitting the RAR, the network device may address it to the corresponding RA-RNTI which is determined as follows:

The RA-RNTI associated with the physical random access channel (PRACH) occasion in which the Random Access Preamble is transmitted, may be computed as:

$$\text{RA-RNTI}=1+s\_id+14\times t\_id+14\times 80\times f\_id+14\times 80\times 8\times ul\_carrier\_id \quad (1)$$

where s_id is the index of the first Orthogonal Frequency Division Multiplexing (OFDM) symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier).

Unless the terminal device is configured with different RACH occasions (ROs) for PCell and SCells, then the RA-RNTI to address terminal devices that perform random access via licensed PCell and terminal devices that perform random access via unlicensed SCell (NR-U UEs) may in some cases be the same. Configurations of different ROs for PCell and SCells may be not necessary since only contention-free random access for multiple TA case is supported on SCell, and for that most likely only e.g. a few preambles would be needed.

So, the network device may send RAR or MSG2 (containing among other information also scheduling information for MSG3) which should be readable by both NR-U and NR terminal device. Such MSG2 MAC protocol data unit (PDU) may contain multiple MAC subPDU (MAC RAR for both legacy and NR-U terminal devices) and it would be beneficial to keep those subPDU of the same size to maintain backward compatibility in NR LAA scenario. Thus, it is worth considering that how to indicate new information in MSG2 MAC subPDU (i.e., MAC RAR) for NR-U terminal device (e.g. LBT type, multiple transmission opportunities and the like) without increasing the MAC RAR payload size. The frequency domain resource allocation (FD-RA) consumes a large amount of bits, and one way to free some bits

TABLE 1

A downlink type 1 resource allocation field consists of a resource indication value (RIV) corresponding to a starting virtual resource block ( $RB_{start}$ ) and a length in terms of contiguously allocated resource blocks $L_{RBs}$. The resource indication value is defined by
   if $(L_{RBs} - 1) \leq \lfloor N_{BWP}^{size} / 2 \rfloor$ then
      $RIV = N_{BWP}^{size}(L_{RBs} - 1) + RB_{start}$
   else
      $RIV = N_{BWP}^{size}(N_{BWP}^{size} - LRBs + 1) + (N_{BWP}^{size} - 1 - RB_{start})$
where $L_{RBs} \geq 1$ and shall not exceed $N_{BWP}^{size} - RB_{start}$.

Recently, multiple message3 (MSG3) opportunities are under discussion for NR operation on unlicensed bands. As another example, the listen-before-talk (LBT) category for MSG3 initial transmission may be provided to the terminal device in RAR.

is to reduce the FD-RA field. In addition, reduction of FD-RA field size is beneficial on its own and may be applicable to NR-U scheduling in general.

In LTE and NR, the following mechanism to reduce the size of FD-RA field in downlink (DL) assignment or UL grant has been considered so far:

(1) By increasing allocation granularity. The value of RIV is received and interpreted to a start RB $RB_{start}$ and number of $L_{RBs}$. These are multiplied by a coefficient K. However, it may cause increasing the granularity of allocation and reducing the flexibility of the network device.

(2) By padding/truncation. A RIV value received in downlink control information is padded with zero and interpreted by a terminal device. However, since random combinations of RB start and number are removed, padding/truncation may result in complexity at the network device when multiplexing MSG3 with other UL traffics.

Thus, new mechanism for bit reduction is needed. According to embodiments of the present disclosure, the number of bits to indicate the resource allocation is reduced and the network device generate the control information based on an offset associated with the bit reduction. In this way, multiple transmission opportunities for the transmission of Msg3 of the random access procedure are provided without increasing the signaling overhead, significant increase in complexity or significant resource allocation restrictions.

Figure 2:
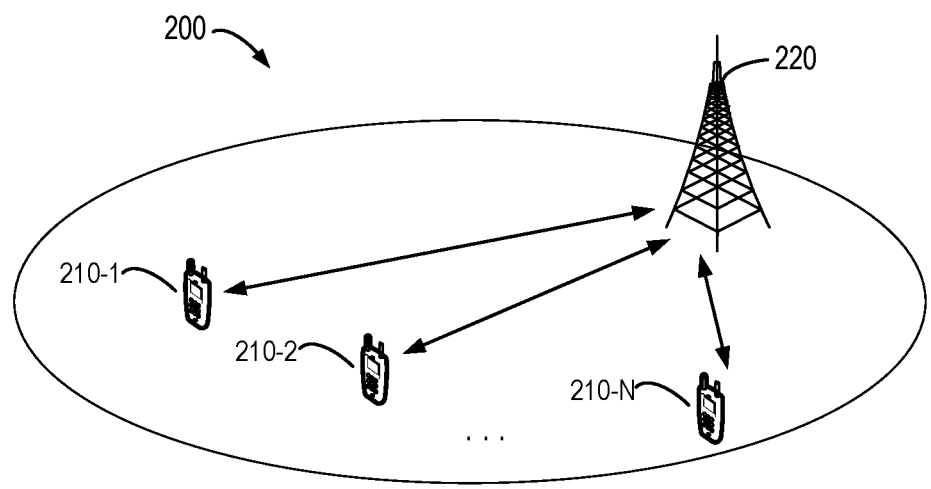
FIG. 2 illustrates a schematic diagram of a communication system according to embodiments of the present disclosure.

FIG. 2 illustrates a schematic diagram of a communication system 200 which embodiments of the present disclosure can be implemented. The communication system 100 comprises the first devices 210 and the second device 220. For the purpose of illustrations, the first devices 210 may be referred to as the terminal device 210 and the second device 220 may be referred to as the network device 220 hereinafter. It should be noted that the first devices and the second devices are interchangeable. For example, the procedures which are described to be implemented at the terminal device may also be able to be implemented at the network device and the procedures which are described to be implemented at the network device may also be able to be implemented at the terminal device.

The link from the second device 220 to the first devices 210 may be referred to as the "downlink" and the link from the first devices 210 to the second device 220 may be referred to as the "uplink."

The communication system 100, which is a part of a communication network, comprises terminal devices 210-1, 210-2, . . . , 210-N (collectively referred to as "terminal device(s) 210" where N is an integer number). The communication system 100 comprises one or more network devices, for example, a network device 220. It should be understood that the communication system 100 may also comprise other elements which are omitted for the purpose of clarity. It is to be understood that the numbers of terminal devices and network devices shown in FIG. 2 re given for the purpose of illustration without suggesting any limitations. The terminal devices 210 and the network device 220 may communicate with each other.

It is to be understood that the number of network devices and terminal devices is only for the purpose of illustration without suggesting any limitations. The system 200 may include any suitable number of network devices and terminal devices adapted for implementing embodiments of the present disclosure.

Communications in the communication system 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 3:
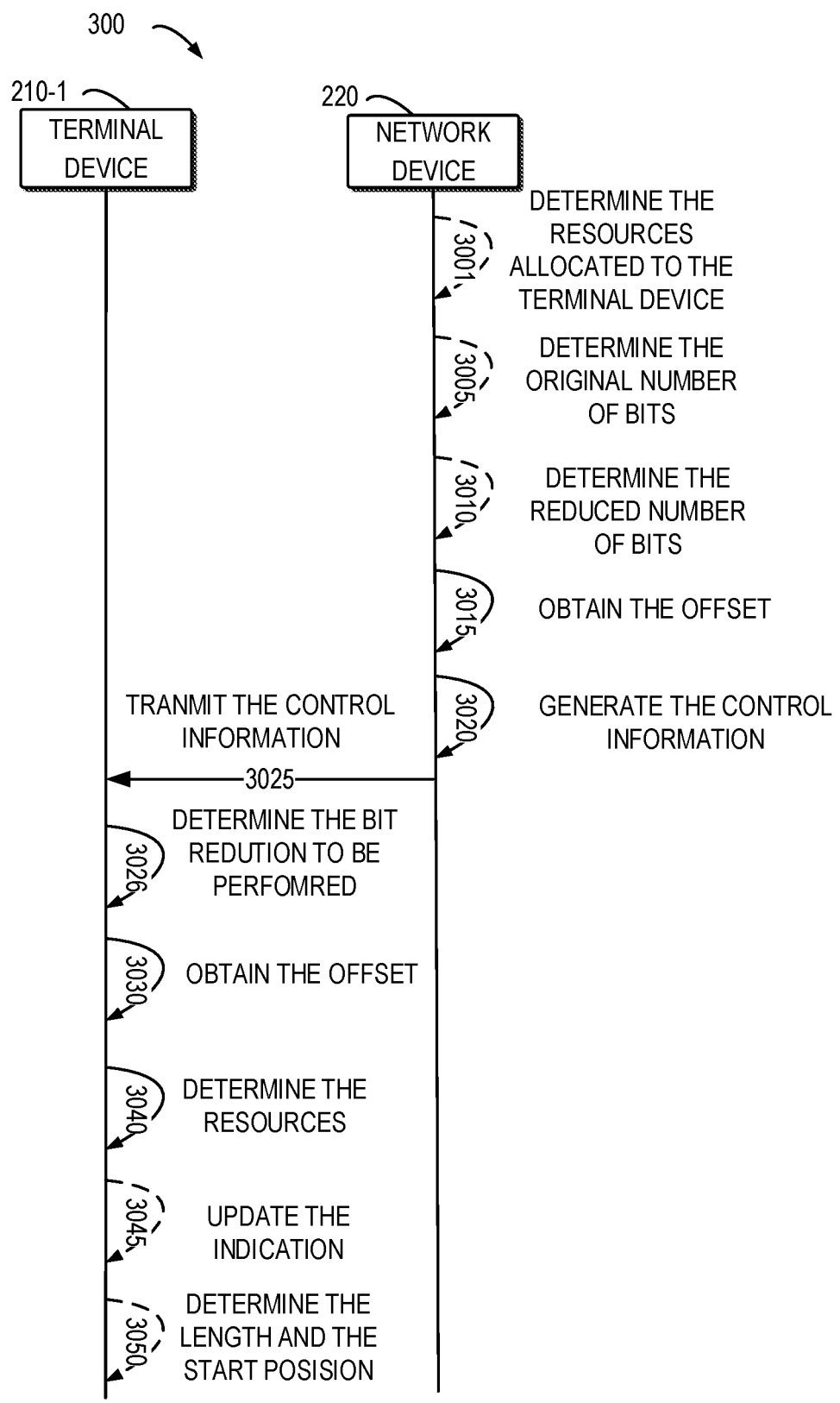
FIG. 3 illustrates a schematic diagram of interactions among devices according to embodiments of the present disclosure.

FIG. 3 illustrates a schematic diagram of interactions 300 in accordance with embodiments of the present disclosure. The interactions 300 may be implemented at any suitable devices. Only for the purpose of illustrations, the interactions 300 are described to be implemented at the terminal device 210-1 and the network device 220. The interactions 300 can be implemented in RAR. Alternatively or in addition, the interactions 300 can be implemented in enhancement of downlink control information and in scenarios of Ultra-Reliable Low-Latency Communication (URLLC). It should be noted that embodiments of the present disclosure can be implemented in any suitable scenarios.

The network device 220 determines 3001 resources allocated for the terminal device 210-1. In some embodiments, the network device 220 determines a minimum amount and a maximum amount of resources which are allowed to allocate to the first device. The network device 220 may further determine the resource allocation in association with the minimum amount and the maximum amount.

In some embodiments, the network device may 3005 determine the original number of bits which are used in the control information to indicate resource allocation. For example, if there are $N_{BWP}$ PRBs that can be allocated to the terminal device 210-1, the number of the PRBs allocated to one terminal device may be from 1 to N. Thus, the number RIV values entries (represented as "$N_{tot}$") can be obtained by:

$$N_{tot} = \frac{(N_{BWP} + 1) * N_{BWP}}{2} \qquad (2)$$

where N is the number of PRBs.
Thus, the original number of bits can be obtained by:

$$2^{b_{tot}} \leq N_{tot} \leq 2^{b_{tot}+1} \qquad (3)$$

where $b_{tot}$ is the original number of bits.

Figure 4A:
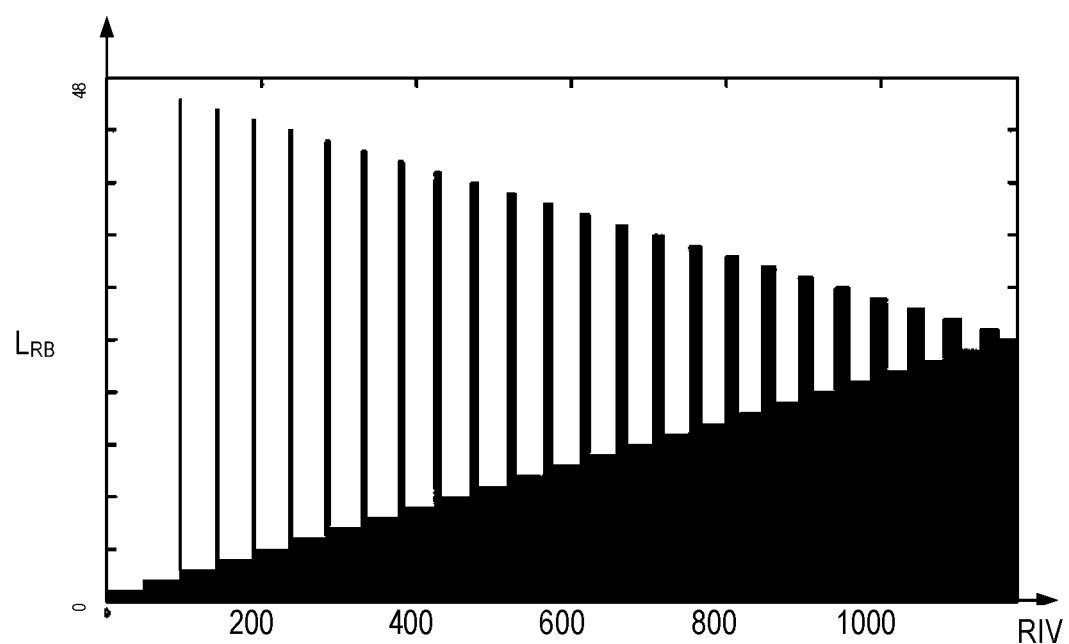
FIG. 4A illustrates diagrams of mapping between resource lengths and indication values according to conventional technologies.

Only for the purpose of illustrations, it assumes that the number of PRBs $N_{BWP}$ is 48. Thus, the number RIV values entries $N_{tot}$ is 1176 and the original number of bits $b_{tot}$ is 11. FIG. 4A illustrates diagrams of mapping between resource lengths and indication values according to conventional technologies. As shown in FIG. 4A, the vertical axis represents the number of the PRB $L_{RB}$ and the horizontal axis represents the number of RIV entries. As shown in FIG. 4A, the range of the number of the PRB $L_{RB}$ may be from 1 to 48 and the number of RIV entries $N_{tot}$ may be 1176.

The network device 220 may determine 3010 the reduced number of bits. The reduced number of bits may be pre-configured. Alternatively or in addition, the network device may determine the reduced number of bits based on the space needed to be free or available for indicating other parameters or information in the control information.

The network device 220 obtains 3015 an offset associated with the bit reduction. In some embodiments, the offset associated with the bit reduction may be pre-defined at the network device 220. Alternatively or in addition, the network device 220 may determine the offset based on the original number of bits and the reduced number of bits. For example, the offset can be obtained by:

$$\text{Offset} = N_{tot} - 2^{b_{tot} - b_{red}} \quad (4)$$

where $b_{red}$ is the reduced number of bits and $b_{tot}$ is the original number of bits for the BWP of size $N_{BWP}$.

Figure 4B:
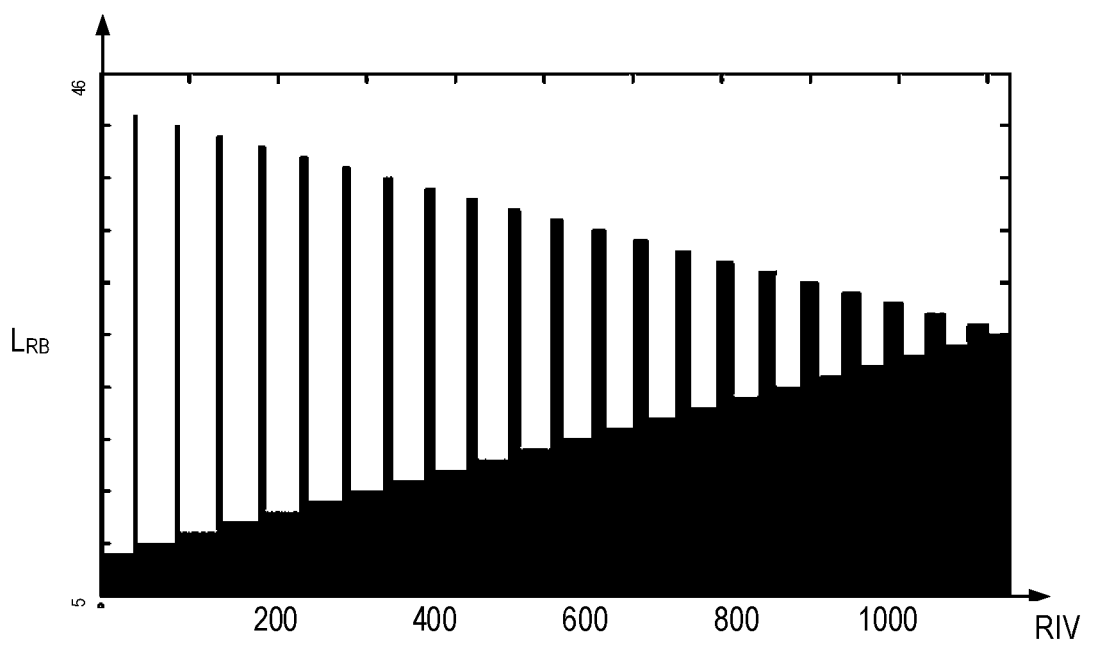
FIG. 4B illustrates diagrams of mapping between resource lengths and indication values according to embodiments of the present disclosure.

Only for the purpose of illustrations, assuming that the reduced number of bits $b_{red}$ is 1, the original number of bits is 11 and the number of RIV entries is $N_{tot}$ 1176, the offset is 152. FIG. 4B illustrates diagrams of mapping between resource lengths and indication values according to embodiments of the present disclosure. As shown in FIG. 4B, the vertical axis represents the number of the PRB $L_{RB}$ and the horizontal axis represents the number of RIV entries. As shown in FIG. 4B, since the reduced number of bits is 1, the range of the number of the PRB $L_{RB}$ may be from 4 to 46 and the number of RIV entries $N_{tot}$ may be 1024. In this way, the information bits can be saved without losing flexibility and performance. Only for the purpose of illustrations, assuming that the reduced number of bits $b_{red}$ is 2, the original number of bits is 11 and the number of RIV entries is $N_{tot}$1176, the offset is 664 and the minimum number of the PRBs is 13.

The network device 220 generates 3020 the control information concerning resource allocation. The control information comprises an indication concerning the resources allocated to the terminal device 110-1. In some embodiments, the network device 220 may determine the start position of the PRBs, $RB_{start}$. In some embodiments, the start position of the PRBs can be any suitable position.

The network device 220 may also determine the number of the PRBs. Since the number of bits reduced in the control information, the maximum and minimum lengths of the PRB may also be affected. Thus, the minimum number of the PRBs allocated to the terminal device can be obtained by:

$$L_{min} = \lceil \text{Offset}/N_{BWP} \rceil + 1 \quad (5)$$

where $L_{min}$ represents the minimum number of the PRBs.
Further, the maximum number of the PRBs allocated to the terminal device can be obtained by:

$$L_{max} = N_{BWP} - \lfloor \text{Offset}/N_{BWP} \rfloor \quad (6)$$

where $L_{max}$ represents the maximum number of the PRBs.

In some embodiments, the network device 120 may determine the start position based on the number of the PRBs if the number of the PRBs equals to a threshold length. The threshold number of may be the minimum number of the PRBs. Alternatively or in addition, the threshold number of may be the maximum number of the PRBs. For example, if the number of the PRBs $L_{RB}$ equals to the minimum number of the PRBs $L_{min}$, the start position $RB_{start}$ can be obtained by:

$$RB_{start} \geq \text{mod}(\text{Offset}, N_{BWP}) \quad (7)$$

If the number of the PRBs $L_{RB}$ equals to the maximum number of the PRBs $L_{max}$, the start position $RB_{start}$ can be obtained by:

$$RB_{start} \leq \min\{N_{BWP} - \text{mod}(\text{Offset}, N_{BWP}), N_{BWP} - L_{max}\} \quad (8)$$

where $L_{min} =$
$\lceil \text{Offset}/N_{BWP} \rceil$ and $L_{max} = \min\{N_{BWP} - \lfloor \frac{\text{Offset}}{N_{BWP}} \rfloor + 1, N_{BWP}\}$.

In some embodiments, the network device 120 may generate the control information based on the start position, the number of and the offset. For example, if $(L_{RB}-1) \leq \lfloor N_{BWP}/2 \rfloor$, the indication in the control information can be obtained by:

$$RIV = N_{BWP}(L_{RB}-1) + RB_{start} - \text{offset} \quad (9)$$

If $(L_{RB}-1) > \lfloor N_{BWP}/2 \rfloor$, the indication in the control information can be obtained by:

$$RIV = N_{BWP}(N_{BWP}-L_{RB}+1) + (N_{BWP}-1-RB_{start}) - \text{offset} \quad (10)$$

where $L_{RB} \geq L_{min}$ and shall not exceed $L_{max}$.

The network device 220 transmits 3025 the control information to the terminal device 210-1. For example, the control information may be transmitted via a Radio Resource Control (RRC) signaling. The bit reduction has been performed on the control information. The control information may be in RAR MAC control element. Alternatively, the control information may be in the UL grant included in the RAR. Alternatively, the control information may be in the DL assignment. In other embodiments, the control information may be in the UL grant.

The terminal device 210-1 determines 3026 that bit reduction is to be performed on the frequency domain resource allocation. In some embodiments, the terminal device 210-1 may determine that bit reduction is performed when the terminal device 210-1 transmits a PRACH or a random access preamble on a cell, for example, on a SCell, on unlicensed band and monitors for associated RAR on a cell, for example, on a PCell, on a licensed band. Alternatively or in addition, the terminal device 210-1 may determine that bit reduction is performed when the terminal device 210-1 is configured with multiple cells and the control information fields or the size of control information fields contained in the RAR is predetermined or configured to depend on the cell on which the terminal device 210-1 transmits a PRACH or a random access preamble associated to the RAR. Alternatively or in addition, the terminal device 210-1 may determine that bit reduction is performed when the random access opportunities of the cells overlap in time.

The terminal device 210-1 obtains 3030 the offset. In some embodiments, the terminal device 210-1 may receive the offset from the network device 220. Alternatively or in addition, the offset may be pre-defined at the terminal device 210-1. In other embodiments, the terminal device 210-1 may determine the original number of bits in the control information and the reduced number of bits. In this example, the terminal device 210-1 may determine the offset based on the original number of bits and the reduced number of bits using the formula (4) as shown above.

The terminal device 210-1 determines 3040 the resources based on the control information and the offset. In some embodiments, the terminal device 210-1 may extract the indication from the control information and update 3045 the indication based on the offset. For example, the indication extracted may be RIV and the updated RIV' may be represented as RIV+Offset. The terminal device 210-1 may determine 3050 the number of the start position of the PRBs based on the updated indication using legacy algorithm.

Embodiments of the present disclosure are able to save information bit without losing flexibility and performance. Further, the implementation complexity of modification to RIV algorithm is very low, since only the offset is introduced. Moreover, it is compatible with increase of allocation granularity.

Figure 5:
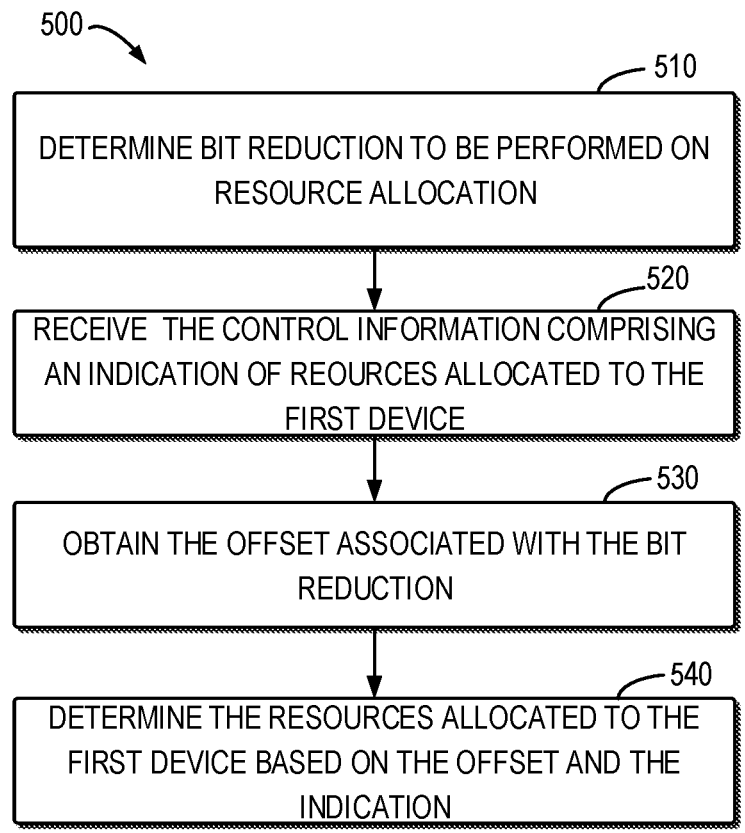
FIG. 5 illustrates a flow chart of a method implemented at a terminal device according to embodiments of the present disclosure.

FIG. 5 illustrates a flow chart of a method 500 in accordance with embodiments of the present disclosure. The method 500 may be implemented at any suitable devices. Only for the purpose of illustrations, the method 500 is described to be implemented at the terminal device 210-1. It should be noted that the method 500 may also be implemented at the network device 220.

At block 510, the terminal device 210-1 determines bit reduction to be performed on resource allocation.

At block 520, the terminal device 210-1 receives the control information from the network device 220. The bit reduction has been performed on the control information. For example, the control information may be transmitted via a Radio Resource Control (RRC) signaling. The bit reduction has been performed on the control information. The control information may be in RAR MAC. Alternatively, the control information may be in the DL assignment. In other embodiments, the control information may be in the UL grant.

At block 530, the terminal device 210-1 determines the offset associated with the bit reduction. In some embodiments, the terminal device 210-1 may receive the offset from the network device 220. Alternatively or in addition, the offset may be pre-defined at the terminal device 210-1. In other embodiments, the terminal device 210-1 may determine the original number of bits in the control information and the reduced number of bits. In this example, the terminal device 210-1 may determine the offset based on the original number of bits and the reduced number of bits using the formula (4) as shown above. The number reduced of bits may be predetermined at the terminal device 210-1. Alternatively, the number reduced of bits may be received from the network device 220.

At block 540, the terminal device 210-1 determines the resources based on the control information and the offset. In some embodiments, the terminal device 210-1 may extract the indication from the control information and update the indication based on the offset. For example, the indication extracted may be RIV and the updated RIV' may be represented as RIV+Offset. The terminal device 210-1 may determine the number of the start position of the PRBs based on the updated indication.

Figure 6:
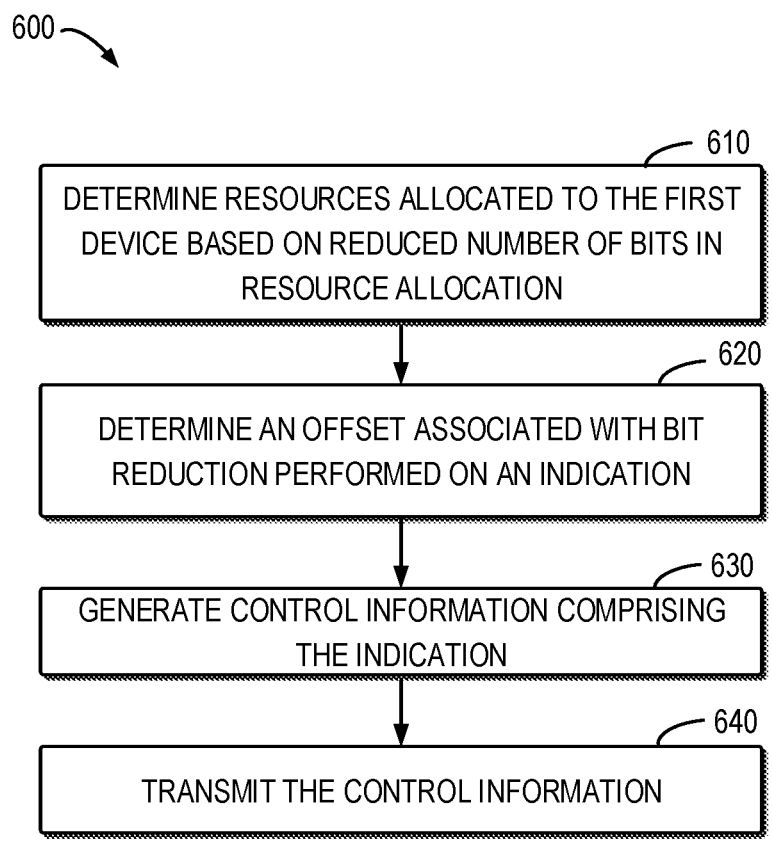
FIG. 6 illustrates a flow chart of a method implemented at a terminal device according to embodiments of the present disclosure.
Figure 7:
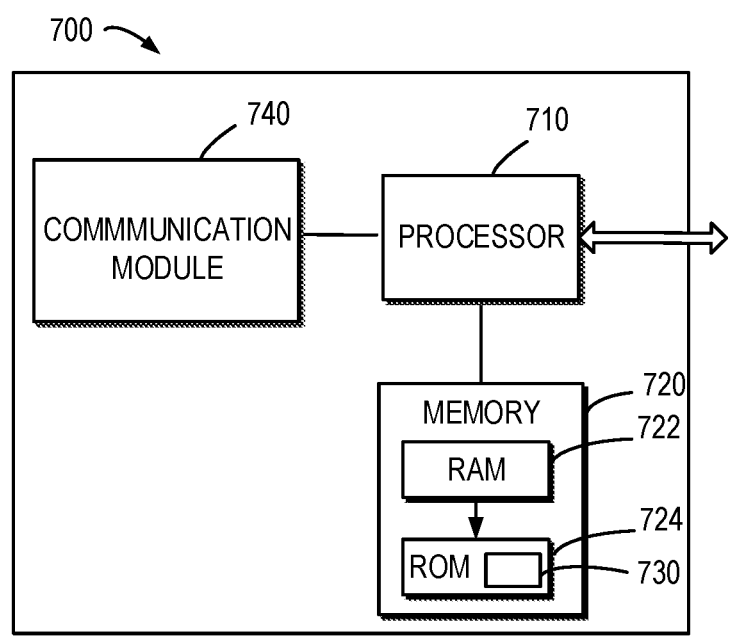
FIG. 7 illustrates a schematic diagram of a device according to embodiments of the present disclosure.

FIG. 6 illustrates a flow chart of a method 600 in accordance with embodiments of the present disclosure. The method 600 may be implemented at any suitable devices. Only for the purpose of illustrations, the method 600 is described to be implemented at the network device 220. It should be noted that the method 600 may also be implemented at the terminal device 210-1.

At block 610, the network device 220 determines resources allocated to a first device based on reduced number of bits of resource allocation. In some embodiments, the network device 220 determines a minimum amount and a maximum amount of resources which are allowed to allocate to the first device. The network device 220 may further determine the resource allocation in association with the minimum amount and the maximum amount.

At block 620, the network device 220 determines the offset associated with the bit reduction. In some embodiments, the offset associated with the bit reduction may be pre-defined at the network device 220. Alternatively or in addition, the network device 220 may determine the offset based on the original number of bits and the reduced number of bits. Only for the purpose of illustrations, assuming that the reduced number of bits $b_{red}$ is 1, the original number of bits is 11 and the number of RIV entries is $N_{tot}$1176, the offset is 152.

In some embodiments, the network device may determine the original number of bits which are used in the control information to indicate resource allocation. For example, if there are $N_{BWP}$ PRBs that can be allocated to the terminal device 210-1, the number of the PRBs allocated to one terminal device may be from 1 to $N_{BWP}$. The original number of bits can be obtained using the above formula (3). Only for the purpose of illustrations, it assumes that the number of PRBs $N_{BWP}$ is 48. Thus, the number RIV values entries $N_{tot}$ is 1176 and the original number of bits $b_{tot}$ is 11. FIG. 4A illustrates diagrams of mapping between resource lengths and indication values according to conventional technologies.

In some embodiments, the network device 220 may determine 3010 the reduced number of bits. The reduced number of bits may be pre-configured. Alternatively or in addition, the network device may determine the reduced number of bits based on the space needed to be free in the control information.

At block 630, the network device 220 generates the control information. The control information comprises an indication concerning the resources allocated to the terminal device 110-1. In some embodiments, the network device 120 may generate the control information based on the start position, the number of and the offset.

In some embodiments, the network device 220 may determine the start position of the PRBs, $RB_{start}$. In some embodiments, the start position of the PRBs can be any suitable position.

In some embodiments, the network device 220 may also determine the number of the PRBs. Since the number of bits reduced in the control information, the maximum and minimum lengths of the PRB may also be affected.

In some embodiments, the network device 120 may determine the start position based on the number of the PRBs if the number of the PRBs exceeds a threshold length. The threshold number of may be the minimum number of the PRBs. Alternatively or in addition, the threshold number of may be the maximum number of the PRB s.

At block 640, the network device 220 transmits the control information to the terminal device 210-1. For example, the control information may be transmitted via a Radio Resource Control (RRC) signaling. The bit reduction has been performed on the control information. The control information may be in RAR MAC. Alternatively, the control information may be in the DL assignment. In other embodiments, the control information may be in the UL grant.

In some embodiments, an apparatus for performing the method 500 (for example, the terminal device 210-1) may comprise respective means for performing the corresponding steps in the method 500. These means may be implemented in any suitable manners. For example, it can be implemented by circuitry or software modules.

In some embodiments, the apparatus comprises means for determining bit reduction is to be performed on resource allocation; means for receiving, at a first device and from a second device, control information comprising an indication of resources allocated to the first device, wherein bit reduction has been performed on the indication; means for determining an offset associated with the bit reduction; and means for determining the resources allocated to the first device based on the offset and the indication.

In some embodiments, the means for obtaining the offset comprises: means for obtaining the original number of bits in the control information; means for obtaining the reduced number of bits in the control information; and means for determining the offset based on the original number of bits and the reduced number of bits.

In some embodiments, the number reduced of bits is predetermined at the first device or received from the second device.

In some embodiments, the means for determining the offset comprises: means for receiving the offset from the second device.

In some embodiments, the offset is predetermined at the first device.

In some embodiments, the means for determining the resources allocated to the first device comprises: means for updating the indication with the offset; and means for determining the resources allocated to the first device based on the updated indication.

In some embodiments, the means for determining the resources allocated to the first device comprises: means for determining a number of a plurality of physical resource blocks allocated to the first device and a start position of the plurality of physical resource blocks based on the updated indication.

In some embodiments, the first device comprises a terminal device and the second device comprises a network device.

In some embodiments, an apparatus for performing the method 600 (for example, the network device 220) may comprise respective means for performing the corresponding steps in the method 600. These means may be implemented in any suitable manners. For example, it can be implemented by circuitry or software modules.

In some embodiments, the apparatus comprises means for determining resources allocated to a first device based on reduced number of bits of resource allocation; means for determining, at a second device, an offset associated with bit reduction performed on an indication concerning resources allocated to the first device; means for generating, based on the offset, control information concerning resource allocation comprising the indication; and means for transmitting the control information to the first device.

In some embodiments, the means for determining the resources comprises means for determining a minimum amount and a maximum amount of resources which are allowed to allocate to the first device; and means for determining the resource allocation in association with the minimum amount and the maximum amount.

In some embodiments, the means for obtaining the offset comprises: means for determining the original number of bits in the control information; means for determining the reduced number of bits in the control information; and means for determining the offset based on the original number of bits and the reduced number of bits.

In some embodiments, the apparatus comprises means for transmitting the offset to the first device.

In some embodiments, the means for generating the control information comprises: means for determining the number of physical resource blocks allocated to the first device; means for determining a start position of the physical resource blocks; and means for generating the indication based on the length, the start position and the offset.

In some embodiments, the apparatus comprises means for determining a threshold number based on the offset; means for in response to the number being a threshold number, determine the start position based on the number, wherein the threshold number comprises a minimum number or a maximum number.

In some embodiments, the first device comprises a terminal device and the second device comprises a network device.

Figure 8:
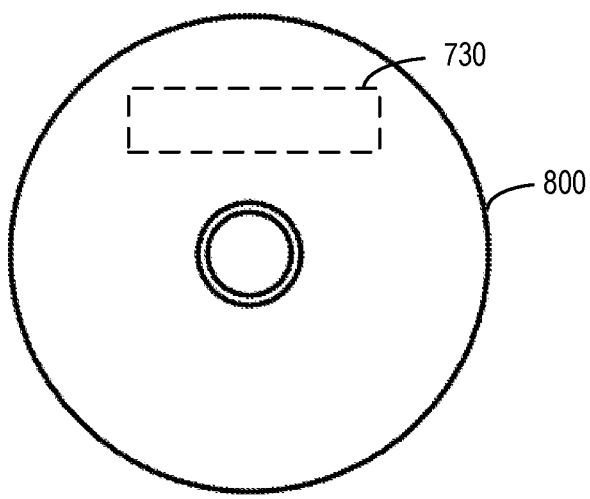
FIG. 8 shows a block diagram of an example computer readable medium in accordance with some embodiments of the present disclosure.

FIG. 8 is a simplified block diagram of a device 700 that is suitable for implementing embodiments of the present disclosure. The device 700 may be provided to implement the communication device, for example the network device 220 or the terminal devices 210 as shown in FIG. 2. As shown, the device 700 includes one or more processors 710, one or more memories 720 coupled to the processor 710, and one or more communication module (for example, transmitters and/or receivers (TX/RX)) 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 3 to 6. The embodiments of the present disclosure may also be implemented by hardware or by a combination of software and hardware.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 9 shows an example of the computer readable medium 700 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 600 as described above with reference to FIGS. 4-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
  at least one processor; and
  at least one memory including computer program codes;
  the at least one memory and the computer program codes are configured to, with the at least one processor, cause the first device to:
    determine bit reduction is to be performed on a frequency domain resource allocation;
    determine that bit reduction is performed after transmitting a physical random access channel (PRACH) or a random access preamble on a cell;
    receive, at the first device and from a second device, control information comprising an indication of resources allocated to the first device, wherein bit reduction has been performed on the indication, wherein the first device comprises a terminal device and the second device comprises a network device;
    determine, an offset associated with the bit reduction, wherein the first device is caused to determine the offset by:
      obtaining an Original number of bits in the control information for a bandwidth part (BWP) of N resource blocks (RB), wherein $b_{tot}$ is the Original number of bits for the BWP of size $N_{BWP}$;
      obtaining a reduced number of bits ($b_{red}$) in the control information,
    wherein the reduced number of bits is predetermined at the first device or received from the second device; and
      determining the offset based on the Original number of bits and the reduced number of bits:
      Offset=$N_{tot}-2^{b\ tot\ -b\ red}$;
    determine the resources allocated to the first device based on the offset and the indication, wherein the first device is caused to determine the resources allocated to the first device by:
      updating the indication with the offset; and
      determining the resources allocated to the first device based on the updated indication;

wherein the indication extracted is a unique resource indication value (RIV) and the updated RIV' is represented as RIV+Offset; and determine a start position of the resources based on the updated indication.

* * * * *